US012253045B2

(12) United States Patent
Kiyono

(10) Patent No.: US 12,253,045 B2
(45) Date of Patent: Mar. 18, 2025

(54) AIR AMOUNT ADJUSTMENT VALVE AND MULTIPLE THROTTLE DEVICE

(71) Applicant: MIKUNI CORPORATION, Tokyo (JP)

(72) Inventor: Jun Kiyono, Odawara (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 18/436,309

(22) Filed: Feb. 8, 2024

(65) Prior Publication Data

US 2024/0309818 A1 Sep. 19, 2024

(30) Foreign Application Priority Data

Mar. 17, 2023 (JP) ................................ 2023-043412

(51) Int. Cl.
*F02D 9/12* (2006.01)
*F02M 25/08* (2006.01)

(52) U.S. Cl.
CPC ............ *F02D 9/12* (2013.01); *F02M 25/089* (2013.01)

(58) Field of Classification Search
CPC .. B60G 17/08; B60G 17/0152; B60G 17/018; B60G 2202/415; B60G 2600/202; B60G 2800/91; B60G 2500/10; B60G 2600/71; B60G 17/06
See application file for complete search history.

(56) References Cited

U.S. PATENT DOCUMENTS

2002/0161496 A1* 10/2002 Yamaki .................. G07C 5/085 701/31.4
2010/0050984 A1* 3/2010 Kato ..................... F02D 9/1065 123/337

FOREIGN PATENT DOCUMENTS

EP 2434136 A2 * 3/2012 .......... F02D 9/1095
JP 2007132235 A 5/2007
JP 2019143586 A 8/2019

OTHER PUBLICATIONS

Extended European search report issued in European Appln. No. 24159540.4, mailed on Jul. 30, 2024.

* cited by examiner

*Primary Examiner* — Jacob M Amick
*Assistant Examiner* — Charles J Brauch
(74) *Attorney, Agent, or Firm* — ROSSI, KIMMS & McDOWELL LLP

(57) ABSTRACT

A multiple throttle device 100 includes: a throttle body 12 having a plurality of intake passages 10; a plurality of throttle valves 20; a plurality of secondary passages 102 respectively bypassing the plurality of throttle valves 20; and an air amount adjustment valve 30 for adjusting an amount of air flowing through the plurality of secondary passages 102. The air amount adjustment valve 30 includes a valve plug 40, and a guide part 50 for guiding the valve plug 40 in the axial direction. Opening into the inner peripheral surface 51 of the guide part 50 are: a plurality of first communication holes 52 respectively communicating with downstream sides of the throttle valves 20 in the plurality of intake passages 10; and a second communication hole 54 communicating with a canister 9 for collecting fuel vapor. The actuator 60 adjusts a position of the valve plug 40 in the axial direction such that a first effective opening area of each of the first communication holes 52 which is not blocked by the valve plug 40 and a second effective opening area of the second communication hole 54 which is not blocked by the valve plug 40 change.

10 Claims, 12 Drawing Sheets

AIR AMOUNT ADJUSTMENT VALVE AND MULTIPLE THROTTLE DEVICE

TECHNICAL FIELD

The present disclosure relates to a multiple throttle device provided with throttle valves in a plurality of intake passages, respectively, and an air amount adjustment valve used for the multiple throttle device.

BACKGROUND

Conventionally, a multiple throttle device is known which is provided with throttle valves in a plurality of intake passages, respectively.

For example, Patent Document 1 describes a multiple throttle device in which the flow rate of bypass air flowing through a bypass air passage bypassing a throttle valve can be adjusted by a single air control valve.

Further, although not related to a multiple throttle device, Patent Document 2 describes a throttle device in which a first adjustment valve for adjusting the amount of air flowing through a secondary passage and a second adjustment valve for adjusting the amount of a fuel evaporative gas purged into an intake passage are driven by the same drive source.

CITATION LIST

Patent Literature

Patent Document 1: JP2007-132235A
Patent Document 2: JP2019-143586A

SUMMARY

It is desirable that fuel vapor generated in a fuel tank is collected in a canister and burned in an engine, rather than discharged to the atmosphere. For example, as described in Patent Document 2, a purge amount adjustment valve is known which has a function of adjusting the amount of the fuel evaporative gas purged into the intake passage.

However, in the multiple throttle device, if the purge amount adjustment valves are separately disposed for the respective intake passages, a requirement for compactness of the multiple throttle device cannot be fulfilled.

In this regard, although Patent Document 1 describes the multiple throttle device in which the flow rate of bypass air can be adjusted by the single air control valve, Patent Document 1 is silent to how to achieve the function of adjusting the purge amount of the fuel evaporation gas while avoiding enlargement of the multiple throttle device.

In view of the above, the object of at least some embodiments of the present invention is to provide a multiple throttle device that can achieve both the function of adjusting the purge amount of fuel vapor and compactness, and an air amount adjustment valve used for the multiple throttle device.

A multiple throttle device according to at least some embodiments of the present invention, includes: a throttle body having a plurality of intake passages; a plurality of throttle valves respectively disposed in the plurality of intake passages; a plurality of secondary passages respectively bypassing the plurality of throttle valves; and an air amount adjustment valve for adjusting an amount of air flowing through the plurality of secondary passages. The air amount adjustment valve includes: a valve plug; a guide part disposed radially outward of the valve plug so as to surround the valve plug and configured to guide the valve plug in an axial direction; and an actuator for driving the valve plug such that the valve plug slides in the axial direction and along an inner peripheral surface of the guide part. Opening into the inner peripheral surface of the guide part are: a plurality of first communication holes respectively communicating with downstream sides of the throttle valves in the plurality of intake passages; and a second communication hole communicating with a canister for collecting fuel vapor. The actuator is configured to adjust a position of the valve plug in the axial direction such that a first effective opening area of each of the first communication holes which is not blocked by the valve plug and a second effective opening area of the second communication hole which is not blocked by the valve plug change.

According to at least some embodiments of the present invention, since the air amount adjustment valve has both the function of adjusting the flow rate of bypass air flowing through the secondary passages and the function of adjusting the fuel vapor purge amount, the number of parts can be reduced compared to a case where a fuel vapor purge amount adjustment valve is provided separately from the air amount adjustment valve. Thus, it is possible to achieve compactness of the multiple throttle device.

DETAILED DESCRIPTION

Figure 1:
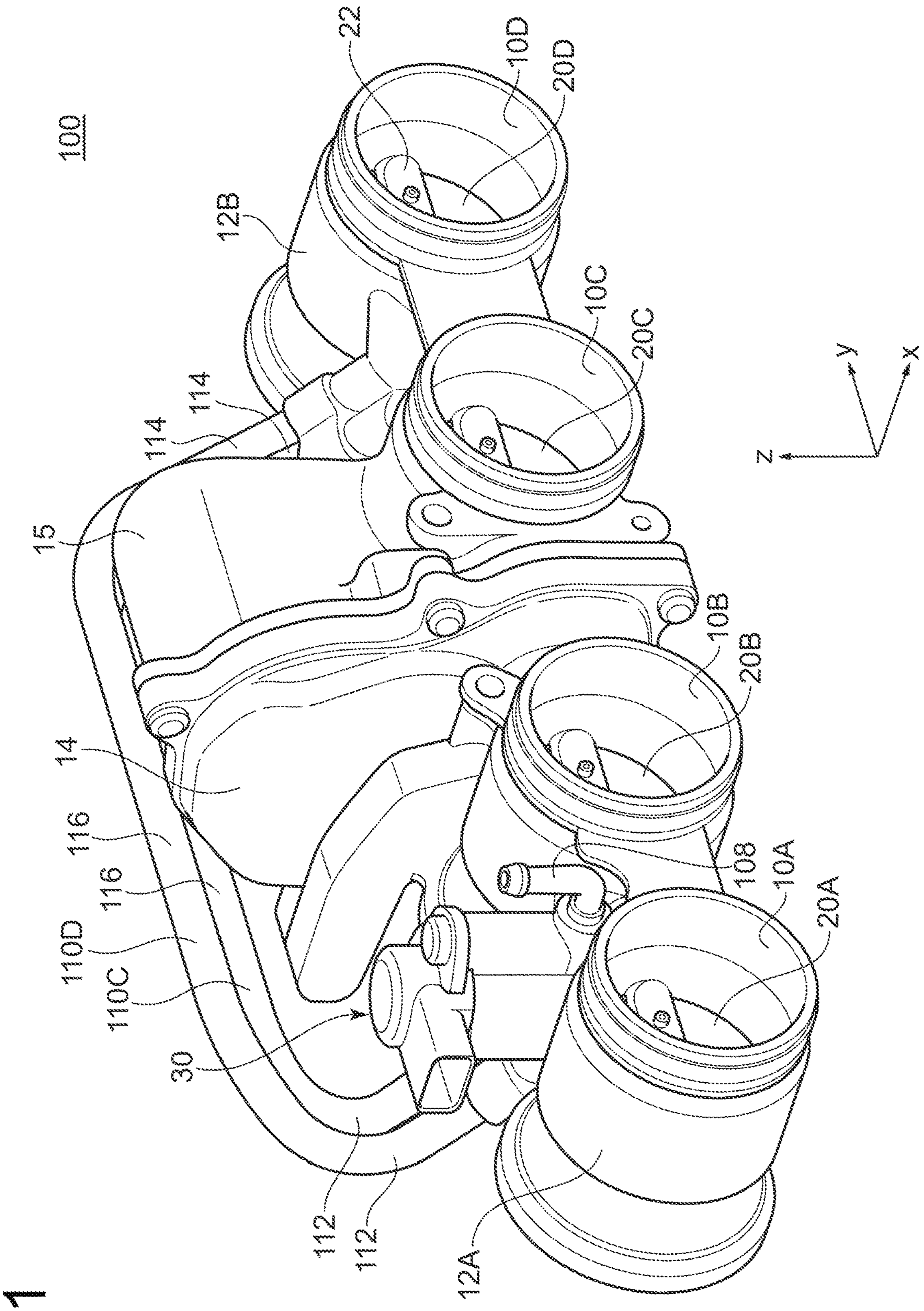
FIG. 1 is a perspective view showing the schematic configuration of a throttle device according to an embodiment.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

FIG. 1 is a perspective view showing the schematic configuration of a throttle device according to an embodiment.

In FIG. 1, an x direction is an intake direction in intake passages (strictly speaking, a direction from upstream to downstream in the intake direction), a y direction is a valve shaft direction, and a z direction is a direction orthogonal to an xy plane including the x direction and the y direction.

Figure 2:
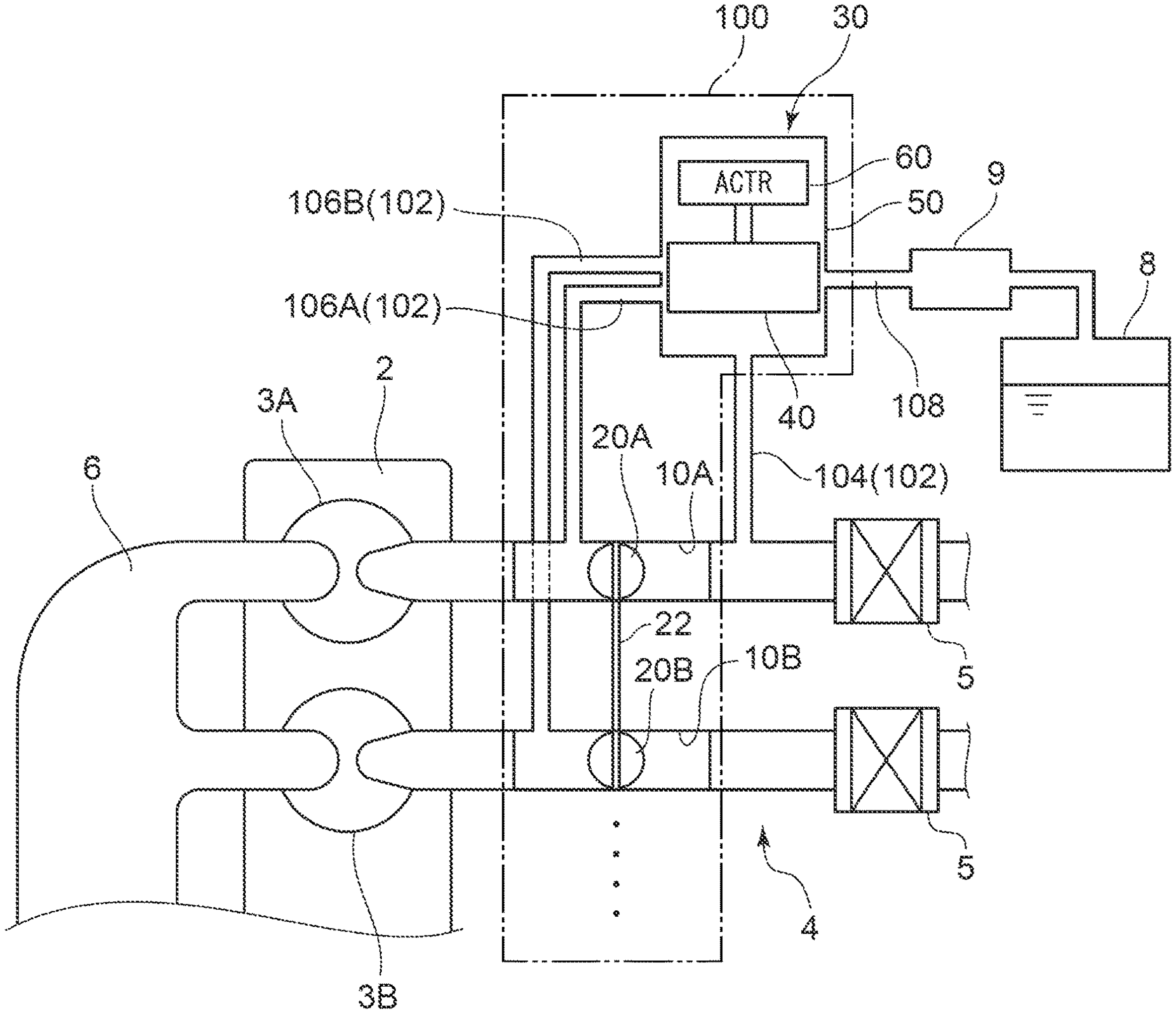
FIG. 2 is a schematic configuration view showing the throttle device and its peripheral equipment according to an embodiment.

FIG. 2 is a schematic configuration view showing the throttle device and its peripheral equipment according to an embodiment.

In some embodiments, as shown in FIG. 1, a throttle device 100 is a multiple throttle device that includes a throttle body 12 having a plurality of intake passages 10 (10A to 10D), and throttle valves 20 (20A to 20D) respectively disposed in the plurality of intake passages 10. The plurality of intake passages 10 (10A to 10D) are disposed in the throttle body 12 so as to extend along the x direction orthogonal to the valve shaft direction y of the throttle valves 20 (20A to 20D), respectively. The plurality of intake passages 10 (10A to 10D) are aligned in the valve shaft direction y of the throttle valves 20 (20A to 20D). Each of the intake passages 10 (10A to 10D) is formed by a through hole penetrating the throttle body 12 in the x direction. The throttle device 100 functions to control, by the throttle valve 20, the flow rate of intake air flowing through each of the intake passages 10 (10A to 10D) in the x direction.

In the exemplary embodiment shown in FIG. 1, the throttle body 12 has the four intake passages 10A to 10D aligned in the y direction. The number N of intake passages 10 is not limited to this example, but may be any integer not less than 2.

The throttle body 12 may be disposed integrally for all the intake passages 10 (10A to 10D), or a plurality of throttle body sections each including at least one intake passage 10 may be coupled to each other to form the throttle body 12.

In the embodiment shown in FIG. 1, the throttle body 12 is formed by two throttle body sections 12A and 12B coupled to each other. Specifically, the throttle body 12 is formed by coupling the throttle body section 12A having a pair of intake passages 10A, 10B and the throttle body section 12B having a pair of intake passages 10C, 10D to each other by an unshown fastening member (such as a bolt).

The intake passages 10 (10A to 10D) are internally provided with the throttle valves 20 (20A to 20D), respectively.

Each of the throttle valves 20 (20A to 20D) is mounted on a valve shaft 22 extending along the valve shaft direction y and is rotatable around the valve shaft 22. If each throttle valve 20 rotates around the valve shaft 22, the flow rate of intake air flowing through a corresponding one of the intake passages 10 in the x direction is adjusted in accordance with the opening degree of the throttle valve 20.

In some embodiments, the valve shaft 22 of the throttle valves 20 extends in the y direction through the throttle body 12 so as to cross the plurality of intake passages 10 (10A to 10D). In this case, one valve shaft 22 functions as a common valve shaft for the plurality of throttle valves 20 (20A to 20D).

In the exemplary embodiment shown in FIG. 1, the valve shaft 22 is disposed so as to penetrate not only the throttle body sections 12A, 12B forming the throttle body 12, but also a gear casing 14 disposed between the throttle body sections 12A, 12B.

The gear casing 14 houses a plurality of gears for transmitting power of a motor (not shown) housed in a motor casing 15 disposed integrally with the throttle body section 12B to the valve shaft 22. The motor housed in the motor casing 15 is disposed in a range where the motor overlaps the intake passage 10C in the y direction. An output shaft of the motor extends inside the motor casing 15 along the y direction. A pinion gear disposed at a distal end of the output shaft of the motor meshes with a first gear housed in the gear casing 14. The first gear transmits a driving force of the motor to a second gear coupled to the valve shaft 22 via at least one relay gear.

The arrangement of the gear casing 14 and the motor (motor casing 15) and the structure of the power transmission path from the motor to the valve shaft 22 are not limited to the example shown in FIG. 1, but any arrangement and structure can be adopted. For example, the gear casing 14 and the motor (motor casing 15) may be arranged at either end of the throttle device 100 in the y direction.

In some embodiments, the throttle device 100 includes an air amount adjustment valve 30 for adjusting the amount of air bypassing the throttle valves 20 and passing through secondary passages, as shown in FIG. 1.

The secondary passages bypassing the throttle valves 20 may be formed by tubes (pipes) or internal passages of the throttle body 12.

In the exemplary embodiment shown in FIG. 1, flexible tubes 110C and 110D are disposed which constitute part of the secondary passages corresponding to the intake passages 10C and 10D, respectively. The flexible tube 110C is part of the secondary passage for supplying bypass air whose flow rate is adjusted by the air amount adjustment valve 30 to a portion downstream of the throttle valve 20C in the intake passage 10C. Likewise, the flexible tube 110D is part of the secondary passage for supplying bypass air whose flow rate is adjusted by the air amount adjustment valve 30 to a portion downstream of the throttle valve 20D in the intake passage 10D.

Each of the flexible tubes 110 (110C, 110D) includes an upstream end 112 near the air amount adjustment valve 30, a downstream end 114 far from the air amount adjustment valve 30, and a middle portion 116 located between the upstream end 112 and downstream end 114. The upstream end 112 is connected to the throttle body section 12A so as to communicate with an internal passage of the throttle body section 12A, which serves as part of the secondary passage. The downstream end 114 is connected to the throttle body section 12B so as to communicate with an internal passage of the throttle body section 12B, which serves as part of the secondary passage. The upstream end 112 and the downstream end 114 extend diagonally from the respective throttle body sections 12A and 12B to ends of the middle portion 116 along the xz plane. The middle portion 116 of each of the flexible tubes 110 (110C, 110D) extends in the y direction so as to pass lateral to the gear casing 14 and the motor casing 15 in the x direction, and connects the upstream end 112 and the downstream end 114.

A communication port 108 communicating with a canister 9 described later is disposed opposite to the flexible tubes 110 (110C, 110D) across the air amount adjustment valve 30 in the x direction. That is, the flexible tubes 110 (110C, 110D) are disposed upstream of the air amount adjustment valve 30 and the communication port 108 is disposed downstream of the air amount adjustment valve 30, in regard to the intake direction x in the intake passages 10.

Details of the internal structure of the air amount adjustment valve 30 and the internal passages (part of the secondary passages) of the throttle body 12 will be described later.

The air amount adjustment valve 30 may be disposed independently of the throttle body 12 (away from the throttle body 12) of the throttle device 100 or may be configured to be assembled to the throttle body 12.

If the air amount adjustment valve 30 is configured to be assembled to the throttle body 12, the air amount adjustment valve 30 may be assembled between a pair of intake passages 10 adjacent to each other in the valve shaft direction y among the plurality of intake passages 10 (10A to 10D) from the viewpoint of compactness of the throttle device 100.

In the exemplary embodiment shown in FIG. 1, the air amount adjustment valve 30 is assembled to the throttle body section 12A so as to be located between the pair of intake passages 10A and 10B. The throttle body section 12A more easily secures a space for installing the air amount adjustment valve 30 than the throttle body section 12B having the motor casing 15.

The air amount adjustment valve 30 is assembled so as to protrude from the throttle body section 12A in the z direction. In the example shown in FIG. 1, the gear casing 14 (and the motor casing 15) protrudes from the throttle body 12 in the z direction. If the air amount adjustment valve 30 is disposed so as to protrude from the throttle body section 12A in the z direction, a space lateral to the gear casing 14 can effectively be utilized as the installation space for the air amount adjustment valve 30.

As viewed in the y direction, the air amount adjustment valve 30 may be arranged so as to fit inside an area occupied by the gear casing 14. In this case, a protruding end of the air amount adjustment valve 30 (a top of the air amount adjustment valve 30) from the throttle body section 12A is located between a z-direction position of a top of the gear casing 14 and a z-direction position of the valve shaft 22.

The throttle device 100 having the above configuration is arranged in an intake system of an engine.

FIG. 2 is a schematic view showing an example of the intake system of the engine. As shown in the drawing, an engine 2 includes a plurality of cylinders 3 (3A, 3B . . . ). Each of the cylinders 3 is connected to an intake system 4 and an exhaust system 6.

The intake system 4 is provided with air cleaners 5. The air cleaners 5 may be disposed one for each intake passage 10 (10A, 10B . . . ) or may be disposed in common for at least two intake passages 10 (10A, 10B . . . ). Intake air from the air cleaner 5 flows into each cylinder 3 (3A, 3B . . . ) of the engine 2 through a corresponding one of the intake passages 10 (10A, 10B . . . ) of the throttle device 100 located downstream of the air cleaner 5. The flow rate of the intake air passing through the intake passages 10 (10A, 10B . . . ) is adjusted by the throttle valves 20 (20A, 20B . . . ).

Fuel vapor from a fuel tank 8 of a vehicle equipped with the engine 2 is collected in the canister 9. The fuel vapor collected in the canister 9 is returned to the intake system 4 via the air amount adjustment valve 30 and burned in the engine 2.

A secondary passage 102 of the throttle device 100 is connected to a position between the air cleaner 5 and the throttle valve 20 in the intake system 4. The secondary passages 102 are disposed so as to bypass the throttle valves 20 (20A, 20B . . . ) in the intake system 4.

The secondary passages 102 include an upstream portion 104 communicating with a passage upstream of the throttle valves 20 (20A, 20B . . . ) in the intake system 4 and downstream portions 106 (106A, 106B . . . ) communicating with a passage downstream of the throttle valves 20 (20A, 20B . . . ) in the intake system 4.

The upstream portion 104 of the secondary passage 102 may be connected to a portion upstream of the throttle valve 20 in the intake passage 10 of the throttle device 100, or may be connected to a conduit downstream of the air cleaner 5 and upstream of the intake passage 10.

Likewise, the downstream portions 106 of the secondary passages 102 may be connected to portions downstream of the throttle valves 20 in the intake passages 10 of the throttle device 100, or may be connected to passages between the throttle device 100 and the engine 2 in the intake system 4.

In the exemplary embodiment shown in FIG. 2, the upstream portion 104 of the secondary passage 102 is connected to the conduit downstream of the air cleaner 5 and upstream of the intake passage 10A. Further, the downstream portions 106 (106A, 106B . . . ) of the secondary passages 102 are connected to the downstream side of the throttle valves 20 (20A, 20B . . . ) in the intake passages 10 (10A, 10B . . . ).

The air amount adjustment valve 30 of the throttle device 100 is disposed in the secondary passages 102.

The air amount adjustment valve 30 includes a valve plug 40, a guide part 50 for guiding the valve plug 40 in the axial direction (an up-down direction in FIG. 2), and an actuator 60 for driving the valve plug 40 in the axial direction.

The air amount adjustment valve 30 switches a communication state between the upstream portion 104 of the secondary passage 102 and the downstream portions 106 (106A, 106B . . . ) of the secondary passages 102, in accordance with an axial position of the valve plug 40. FIG. 2 shows a state where the valve plug 40 blocks the communication between the upstream portion 104 and the downstream portions 106 (106A, 106B . . . ), and there is no bypass air flow via the secondary passages 102.

The air amount adjustment valve 30 includes the communication port 108 with the canister 9.

The air amount adjustment valve 30 switches a communication state between the canister 9 and the downstream portions 106 (106A, 106B . . . ) of the secondary passages 102, in accordance with the axial position of the valve plug 40. FIG. 2 shows a state where the valve plug 40 blocks the communication between the communication port 108 and the downstream portions 106 (106A, 106B . . . ), and there is no flow of the fuel vapor, which is collected in the canister 9, via the downstream portions 106 (106A, 106B . . . ).

Subsequently, a detailed structure of the air amount adjustment valve 30 will be described.

Figure 3:
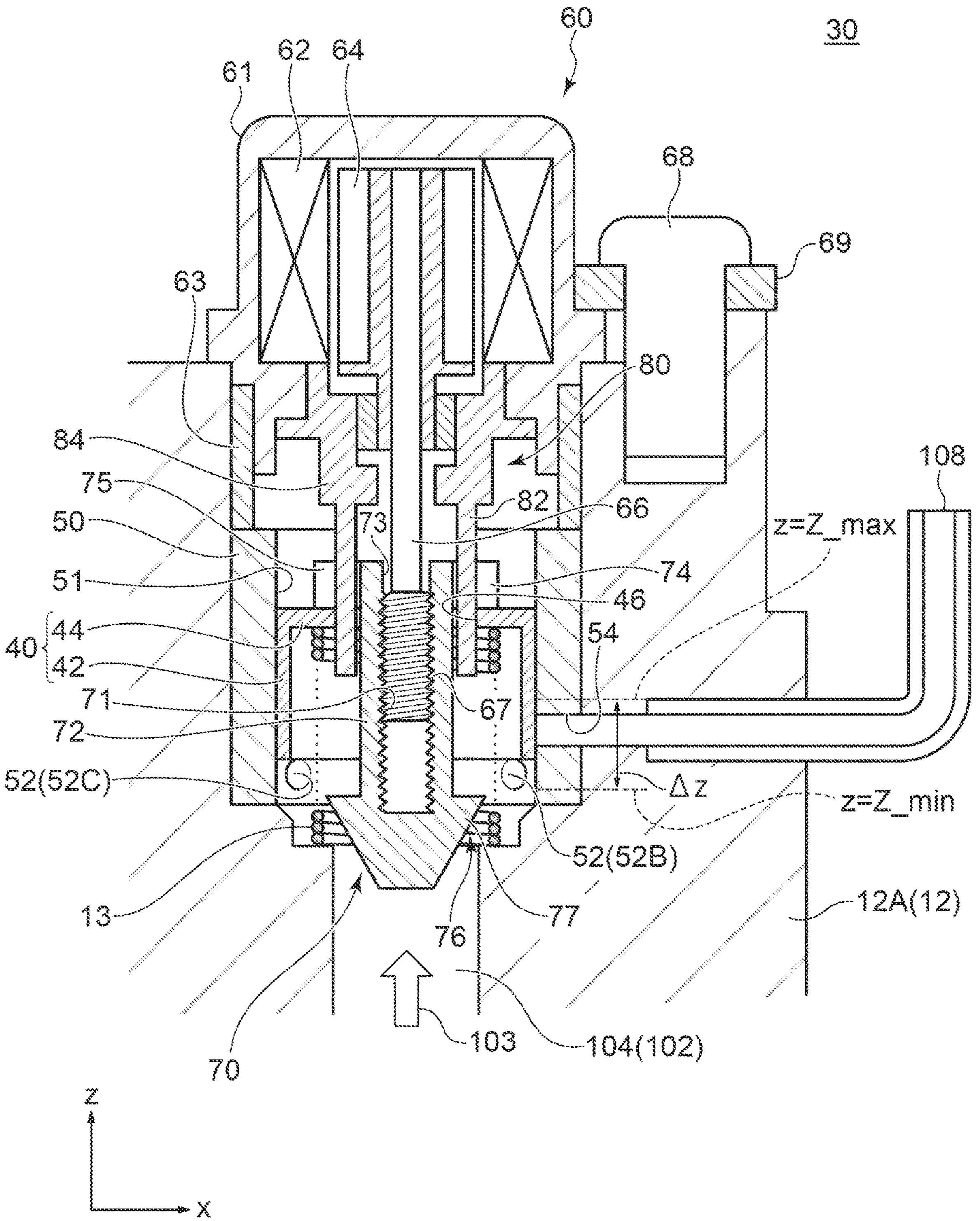
FIG. 3 is a cross-sectional view showing the structure of an air amount adjustment valve according to an embodiment, and is a partial cross-sectional view of the throttle device along an xz plane passing through the air amount adjustment valve of FIG. 1.

FIG. 3 is a cross-sectional view showing the structure of the air amount adjustment valve according to an embodiment, and is a partial cross-sectional view of the throttle device 100 along the xz plane passing through the air amount adjustment valve 30 of FIG. 1.

Figure 4A:
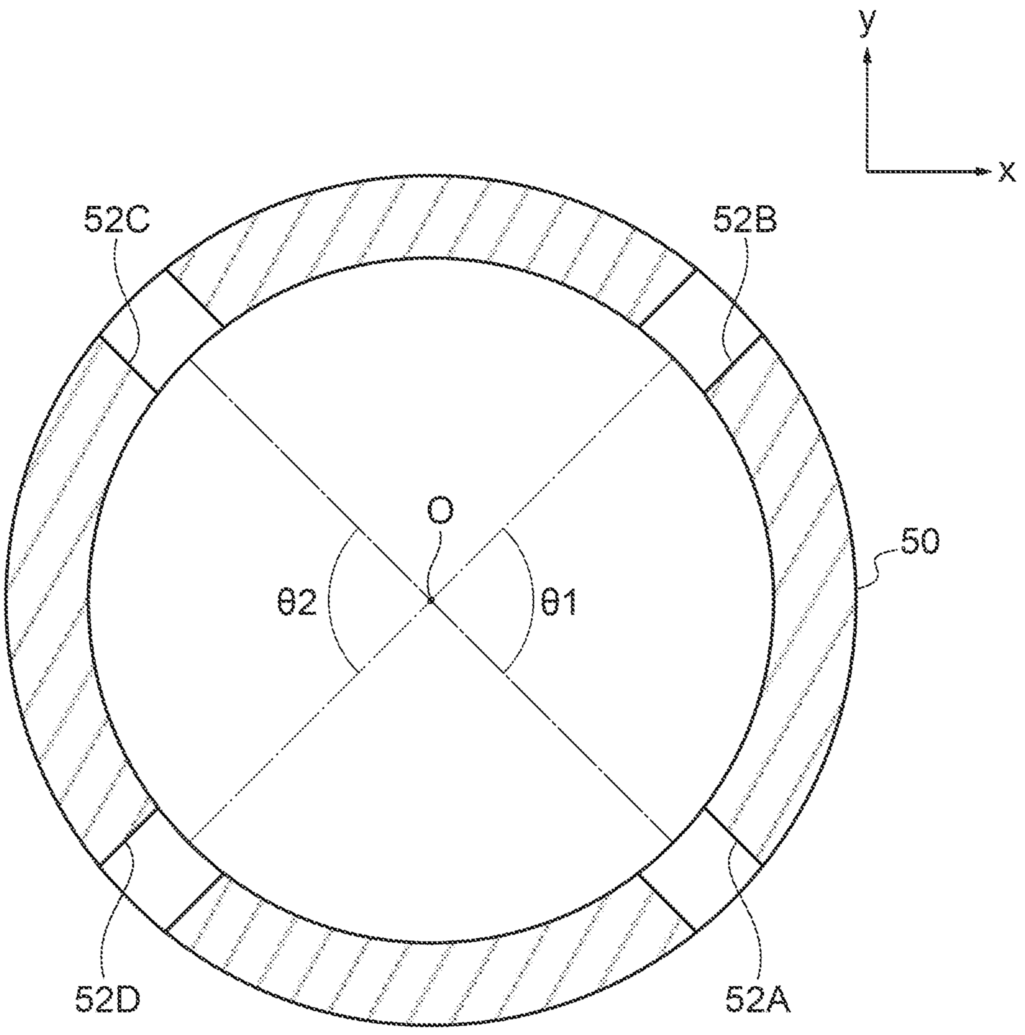
FIG. 4A is a cross-sectional view showing an example of arrangement of first communication holes in a guide cylinder of the air amount adjustment valve.
Figure 4B:
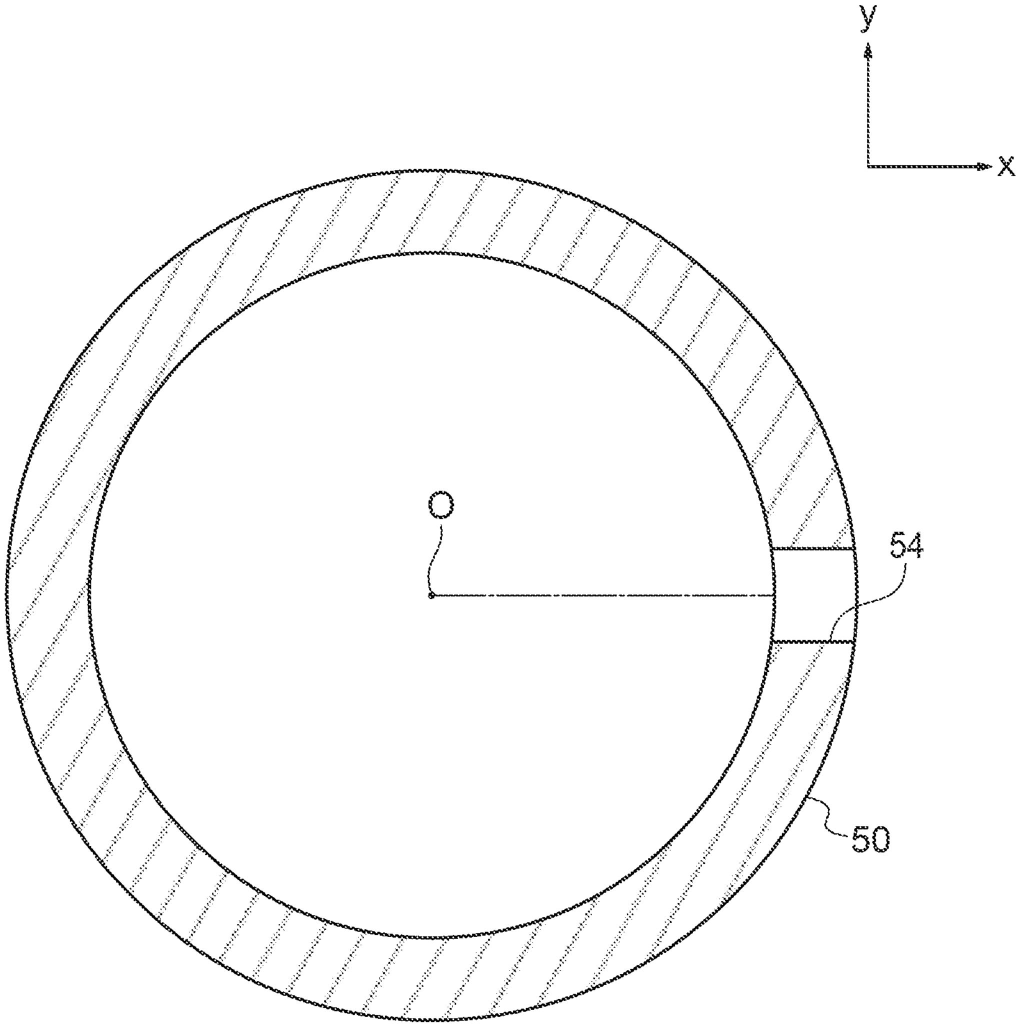
FIG. 4B is a cross-sectional view showing an example of arrangement of a second communication hole in the guide cylinder of the air amount adjustment valve.
Figure 5:
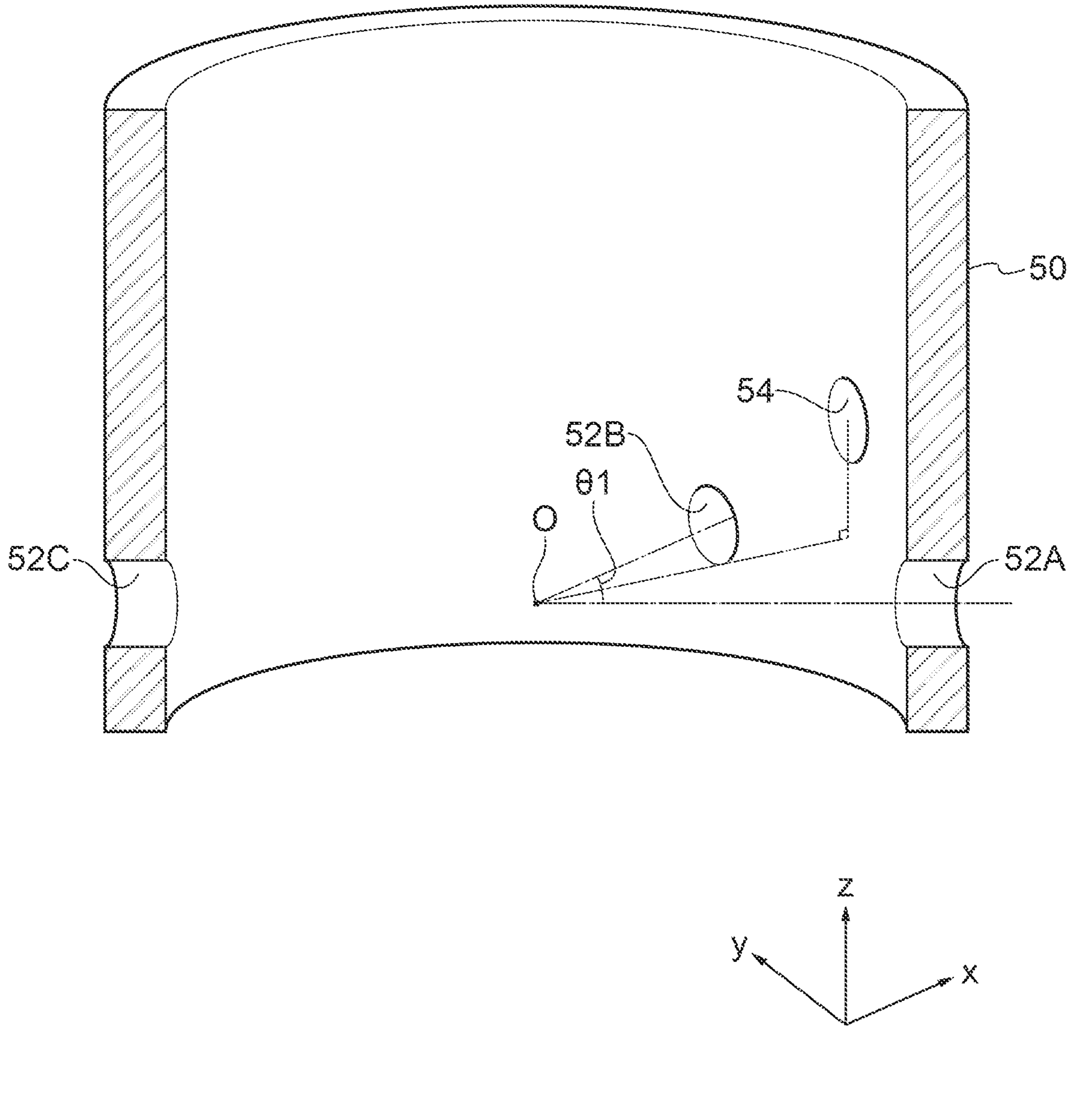
FIG. 5 is a perspective cross-sectional view of the guide cylinder, for describing a positional relationship between the first communication holes and the second communication hole.

FIG. 4A is a cross-sectional view showing an example of arrangement of first communication holes in a guide cylinder of the air amount adjustment valve. FIG. 4B is a cross-sectional view showing an example of arrangement of a second communication hole in the guide cylinder of the air amount adjustment valve. FIG. 5 is a perspective cross-sectional view of the guide cylinder, for describing a positional relationship between the first communication holes and the second communication hole.

Figure 6:
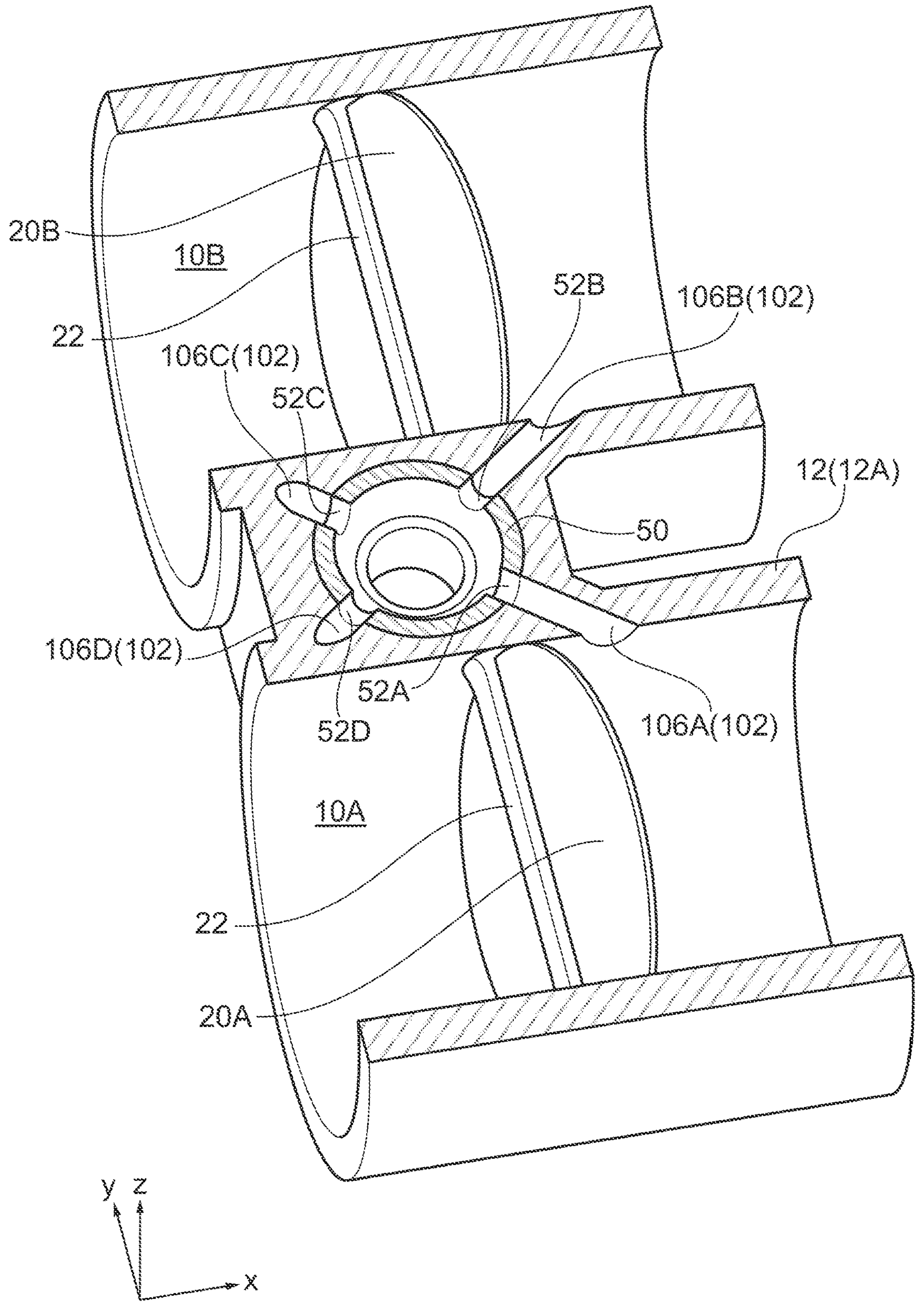
FIG. 6 is a perspective cross-sectional view of a throttle body.

FIG. 6 is a perspective cross-sectional view of the throttle body.

Figure 7:
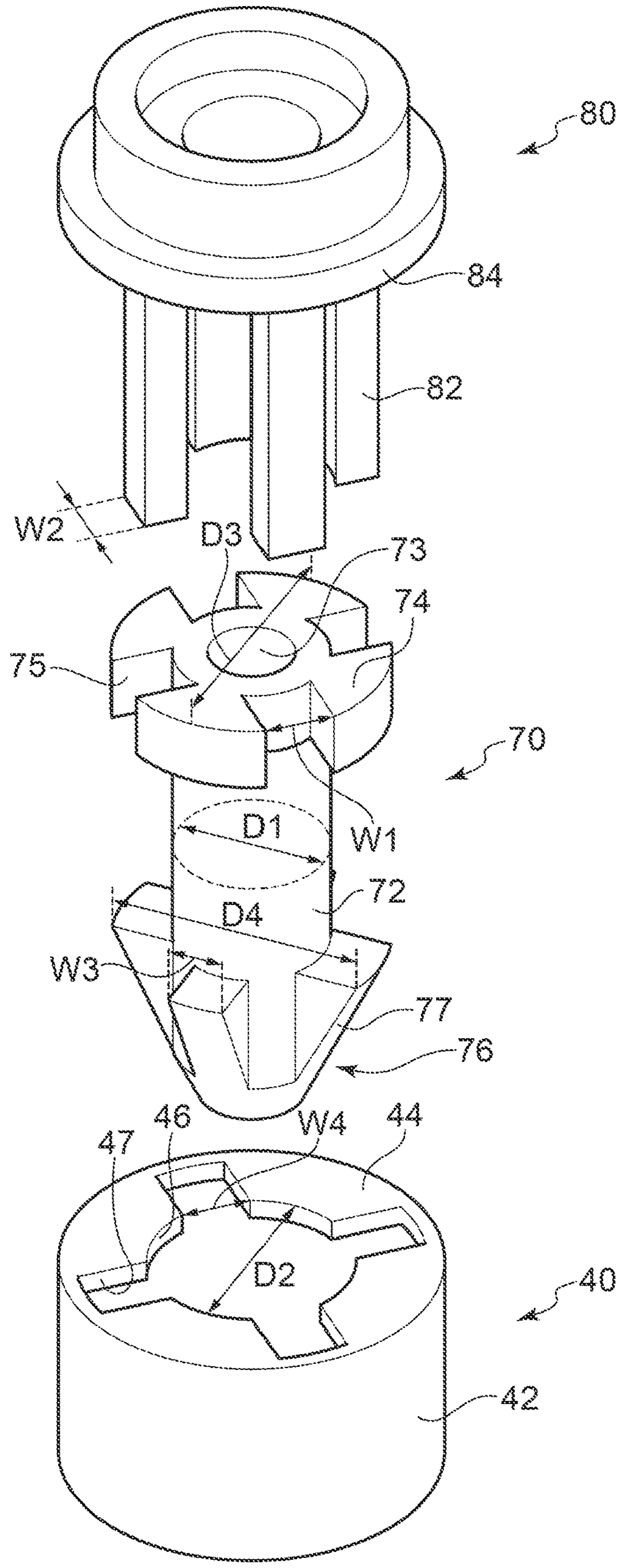
FIG. 7 is a perspective view showing a group of some parts of the air amount adjustment valve according to an embodiment.
Figure 8:
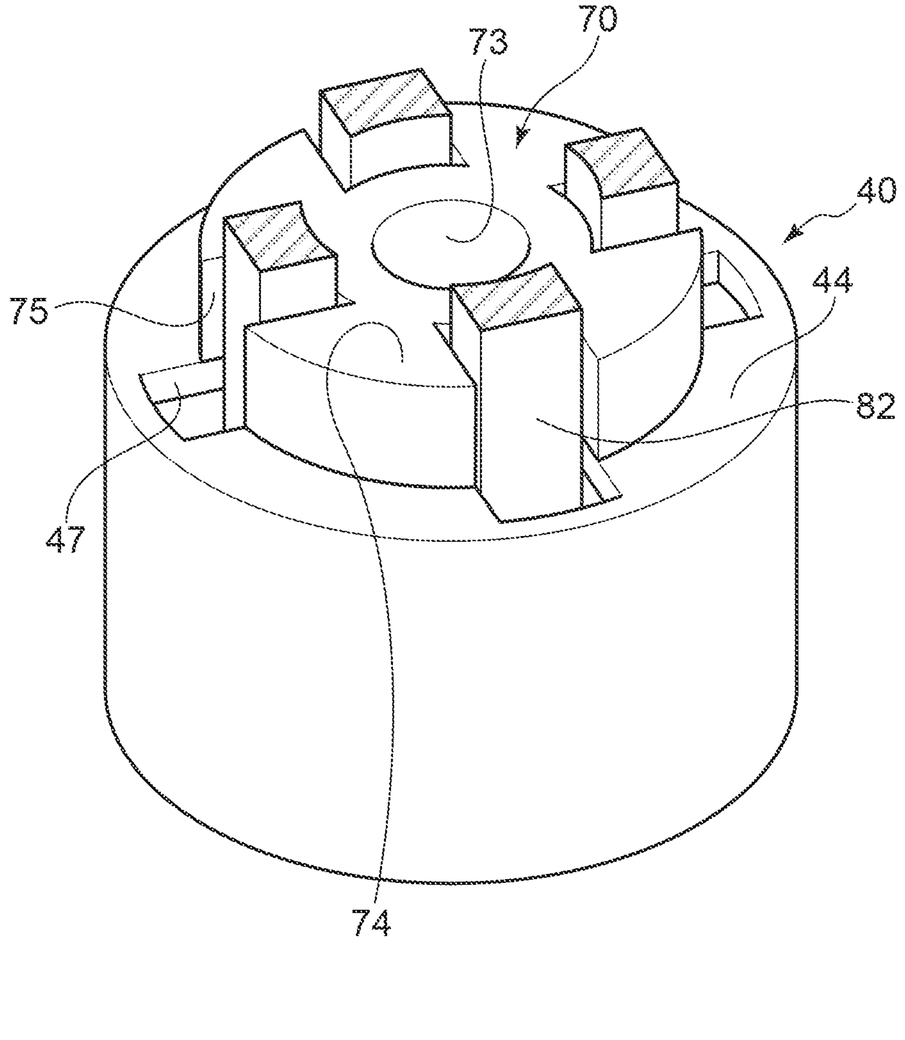
FIG. 8 is a perspective cross-sectional view of the group of parts shown in FIG. 7 after assembly.

FIG. 7 is a perspective view showing a group of some parts of the air amount adjustment valve according to an embodiment. FIG. 8 is a perspective cross-sectional view of the group of parts shown in FIG. 7 after assembly.

As shown in FIG. 3, the air amount adjustment valve 30 is assembled to the throttle body 12 (throttle body section 12A).

In the example shown in FIG. 3, the air amount adjustment valve 30 is assembled to the throttle body 12 such that the axial direction of the air amount adjustment valve 30 is along the z direction. The orientation of the air amount adjustment valve 30 in the state of being assembled to the throttle body 12 is not limited to the present example, but the air amount adjustment valve 30 can be assembled to the throttle body 12 in any orientation.

In some embodiments, the air amount adjustment valve 30 includes the guide part 50 for guiding the valve plug 40 in the axial direction, and the actuator 60 for driving the valve plug 40 in the axial direction. The guide part 50 is disposed radially outward of the valve plug 40 so as to surround the valve plug 40. If the valve plug 40 is driven by the actuator 60 in the axial direction, the valve plug 40 slides along an inner peripheral surface 51 of the guide part 50 in the axial direction.

The valve plug 40 includes a cylindrical portion 42 having a cylindrical shape, and may be a plunger. An outer peripheral surface of the cylindrical portion 42 is in sliding contact with the inner peripheral surface 51 of the guide part 50. The upstream portion 104 of the secondary passage 102 is disposed, as the internal passage of the throttle body 12, upstream of the valve plug 40 in a bypass air flow direction (an arrow 103 in FIG. 3). In the state where the air amount adjustment valve 30 is assembled to the throttle body 12, the valve plug 40 faces the upstream portion 104 of the secondary passage 102.

In an embodiment, as shown in FIGS. 3 and 7, the valve plug 40 includes a disc portion 44 extending radially inward from an upper end of the cylindrical portion 42. The disc portion 44 receives a driving force of the actuator 60 via a protrusion 74 of a moving part 70 described later. A spring 13 is disposed between the disc portion 44 and the throttle body 12 so that the disc portion 44 is not separated from the moving part 70. The spring 13 pushes the disc portion 44 of the valve plug 40 against the moving part 70 in the axial direction.

An axial movable range Δz (=Z_max-Z_min) of the valve plug 40 by the actuator 60 is defined, with reference to a z-direction position of the lower end of the cylindrical portion 42, as a distance between Z_min where the z-coordinate at this reference position is minimum and Z_max where the z-coordinate at the reference position is maximum.

The disc portion 44 may have a through hole 46 on the radially inner side, and may have a plurality of slits 47 on an outer peripheral side of the through hole 46, as shown in FIG. 7.

The inner peripheral surface 51 of the guide part 50 is provided with a plurality of first communication holes 52 (52A to 52D) and a second communication hole 54. The shape of the first communication holes and the second communication hole 54 is not particularly limited, but may be, for example, circular or oval.

The plurality of first communication holes 52 (52A to 52D) respectively communicate with downstream sides of the throttle valves 20 (20A to 20D) in the plurality of intake passages 10 (10A to 10D) via the downstream portions 106 (106A to 106D) of the secondary passages 102 shown in FIG. 2. FIG. 3 shows the first communication holes 52B, 52C respectively communicate with the intake passages 10B, 10C among the plurality of first communication holes 52 (52A to 52D).

The second communication hole 54 communicates with the canister 9 via the communication port 108.

In some embodiments, the plurality of first communication holes 52 (52A to 52D) are disposed at the same axial position and at mutually different circumferential positions, as shown in FIGS. 3, 4A, and 6.

As shown in FIG. 6, the first communication holes 52A, 52B are connected to the downstream sides of the throttle valves 20A, 20B in the intake passages 10A, 10B via the downstream portions 106A, 106B of the secondary passages 102 formed by the internal passages disposed in the throttle body section 12A. By contrast, the first communication holes 52C, 52D are connected to the downstream sides of the throttle valves 20C, 20D in the intake passages 10C, 10D via the downstream portions 106C, 106D of the secondary passages 102. Herein, FIG. 6 partially shows the internal passages of the throttle body section 12A, which form part of the downstream portions 106C, 106D of the secondary passages 102. These two internal passages penetrate the throttle body section 12A in a direction oblique to the xy plane and communicate with the flexible tubes 110C, 110D (see FIG. 1) forming part of the downstream portions 106C, 106D of the secondary passages 102.

In the exemplary embodiments shown in FIGS. 4A and 6, an angle θ1 between the first communication hole 52A and the first communication hole 52B around a center O of the guide part 50 and an angle θ2 between the first communication hole 52C and the first communication hole 52D around the center O of the guide part 50 are set at less than 90 degrees. The angles θ1 and 02 may be set at not less than 45 degrees and not greater than 80 degrees.

Whereby, the internal passages (the downstream portions 106A to 106D of the secondary passages 102) of the throttle body section 12A, which are connected to the respective first communication holes 52 (52A to 52D), can be arranged using the limited space between the intake passages 10A, 10B in the valve shaft direction y in the throttle device 100.

In some embodiments, the second communication hole 54 may be disposed at a position displaced from the respective first communication holes 52 (52A to 52D) in the axial direction. In this case, it is sufficient if the centroids of the first communication holes 52 and the centroid of the second communication hole 54 are misaligned in the axial direction, and the first communication holes 52 and the second communication hole 54 may partially overlap in the axial direction.

In the embodiments shown in FIGS. 3 and 5, the first communication holes 52 and the second communication hole 54 are disposed without overlapping each other in the axial direction so that the centroid of the second communication hole 54 is displaced to the actuator 60 side relative to the centroid of each of the first communication holes 52 (52A to 52D) in the axial direction.

In the exemplary embodiments shown in FIGS. 4A, 4B, and 5, the second communication hole 54 is disposed within a range of the angle θ1 between the first communication holes 52A, 52B disposed in the throttle body section 12A, in the circumferential direction. That is, the second communication hole 54 is disposed between the first communication holes 52A, 52B in regard to the circumferential direction. For example, the second communication hole 54 may be disposed on a bisector of the angle θ1 between the first communication holes 52A, 52B.

In this case, a line segment connecting the center O of the guide part 50 and the second communication hole 54 is substantially parallel to the intake direction x, facilitating connection between the second communication hole 54 and the communication port 108 (see FIG. 1) disposed so as to protrude from the air amount adjustment valve 30 in the x direction.

In an embodiment, the guide part 50 is a cylindrical guide cylinder surrounding the valve plug 40, as shown in FIG. 3. The guide cylinder (guide part) 50 is inserted into a cylindrical hole (bore) disposed in the throttle body 12 (throttle body section 12A).

In another embodiment, the guide part 50 is formed by a wall surface of the cylindrical bore disposed in the throttle body 12. In this case, the first communication holes 52 opening to the inner peripheral surface of the guide part 50 are formed by opening ends of the downstream portions 106 (106A to 106B) of the secondary passages 102 to the bore wall surface.

As shown in FIG. 3, the plurality of first communication holes 52 (52A to 52D) are located on an inner side of the movable range Δz of the valve plug 40 in regard to the axial direction (z direction).

Therefore, as the valve plug 40 moves in the axial direction within the movable range, a first effective opening area of each of the first communication holes 52 (52A to 52D) which is not blocked by the cylindrical portion 42 of the valve plug 40 changes, and the amount of bypass air flowing from the upstream portion 104 of the secondary passage 102 toward the corresponding one of the intake passages 10 (10A to 10D) is adjusted.

In the example shown in FIG. 3, the first effective opening areas of the first communication holes 52B, 52C are approximately equal to the total opening areas of the first communication holes 52B, 52C, and the air amount adjustment valve 30 is substantially fully open in regard to the first communication holes 52.

Likewise, as shown in FIG. 3, the second communication hole 54 is also located on the inner side of the movable range Δz of the valve plug 40 in regard to the axial direction (z direction).

Therefore, as the valve plug 40 moves in the axial direction within the movable range, a second effective opening area of the second communication hole 54 which is not blocked by the cylindrical portion 42 of the valve plug 40 changes, and the amount of fuel vapor taken into an inner space of the guide part 50 via the communication port 108 and the second communication hole 54 is adjusted. The fuel vapor taken into the inner space of the guide part 50 mixes with the bypass air (see the arrow 103) flowing through the upstream portion 104 of the secondary passage 102 and flows toward the respective intake passages 10 (10A to 10D) via the respective first communication holes 52 (52A to 52D).

In the example shown in FIG. 3, the second communication hole 54 is fully closed (second effective opening area=0), and the fuel vapor flow from the canister 9 via the communication port 108 is blocked by the valve plug 40.

The actuator 60 can have any configuration as long as actuator 60 can drive the valve plug 40 in the axial direction.

In an embodiment, as shown in FIG. 3, the actuator 60 is a stepper motor that includes a casing 61, a stator including a coil 62, a moving part 70 including a magnet 64 disposed on a radially inner side of the coil 62, and an output shaft 66 disposed in the moving part 70. The output shaft 66 of the stepper motor (actuator) 60 extends in the axial direction (z direction) of the air amount adjustment valve 30. A male thread 67 is disposed on an outer circumference of the output shaft 66.

In the exemplary embodiment shown in FIG. 3, a fastening bolt 68 and a pressing plate 69 are used to assemble the air amount adjustment valve 30 including the stepper motor (actuator) 60 to the throttle body 12. The pressing plate 69 is disposed along an outer peripheral edge of the casing 61 of the stepper motor 60. If the fastening bolt 68 is screwed into the throttle body 12, the casing 61 is fixed to the throttle body 12 with a flange portion of the casing 61 interposed between the pressing plate 69 and the throttle body 12.

As shown in FIGS. 3 and 7, the moving part 70 has a cylindrical portion 72 with a female thread 71, and a plurality of protrusions 74 protruding radially outward from one end of the cylindrical portion 72. Further, another end of the cylindrical portion 72 is provided with a plurality of projections 77 projecting radially outward, and the plurality of projections 77 constitute a stopper portion 76.

The cylindrical portion 72 has an axial hole 73 formed with the female thread 71 on an inner peripheral surface thereof. The output shaft 66 of the stepper motor 60 is screwed into the axial hole 73, and the female thread 71 of the cylindrical portion 72 and the male thread 67 of the output shaft 66 screw together. An outer diameter D1 of the cylindrical portion 72 has a dimension which is not greater than an inner diameter D2 of the through hole 46 of the valve plug 40.

The plurality of protrusions 74 are disposed in the circumferential direction. The protrusions 74 adjacent in the circumferential direction are separated by a slit 75. The slit 75 allows a plurality of locking rods 82 of a detent part 80 described later to pass through. A maximum outer diameter D3 of the moving part 70 passing through a pair of protrusions 74 located opposite to each other across the central axis of the moving part 70 is greater than the inner diameter D2 of the through hole 46 of the valve plug 40. A width w1 of the slit 75 is not less than a width w2 of the locking rod 82 of the detent part 80 described later. That is, the locking rod 82 can pass through the slit 75. The protrusion 74 of the moving part 70 contacts the disc portion 44 of the valve plug 40 and functions to transmit the driving force of the actuator (stepper motor) 60 to the valve plug 40. Further, the protrusion 74 contacts a locking ring 84 of the detent part 80 described later, when the moving part 70 moves most to the actuator 60 side. That is, the protrusion 74 of the moving part 70 also functions as a stopper defining the maximum position Z_max in the movable range Δz of the moving part 70.

The plurality of projections 77 of the stopper portion 76 are arranged at intervals from each other in the circumferential direction. A width w3 of each of the projections 77 is not greater than a width w4 of the slit 47 of the valve plug 40. That is, the projection 77 can pass through the slit 47. An outer surface of the projection 77 has a tapered shape decreasing in diameter toward the actuator 60 side in the axial direction. The stopper portion 76 (projection 77) contacts the throttle body 12 when the moving part 70 moves the farthest away from the actuator 60. That is, the stopper portion 76 of the moving part 70 functions as a stopper defining the minimum position Z_min in the movable range Δz of the moving part 70.

The detent part 80 is a stationary member fixed to the casing 61 side and functions to prevent the moving part 70 from rotating in conjunction with the rotation of the output shaft 66.

The detent part 80 includes the plurality of locking rods 82 engaging the slit 75 of the moving part 70 to regulate the rotation of the moving part 70, and a locking ring 84 contacting the protrusion 74 when the moving part 70 moves most to the actuator 60 side. Each of the locking rods 82 extends from the locking ring 84 in the axial direction.

A circumferential position of the projection 77 of the stopper portion 76 is aligned with a circumferential position of the slit 47 of the valve plug 40 when the air amount adjustment valve 30 is assembled which includes the valve plug 40, the moving part 70, and the detent part 80 in the above-described configuration. In this state, the moving part 70 is moved in the axial direction relative to the valve plug 40 such that the projection 77 passes through the slit 47. Consequently, the projection 77 (stopper portion 76) enters to the inside of the cylindrical portion 42. Thereafter, the moving part 70 is rotated in the circumferential direction such that circumferential positions of the protrusion 74 and the disc portion 44 coincide and the circumferential positions of the slit 75 and the slit 47 coincide. The valve plug 40 and the moving part 70 thus assembled are mounted to the inside of the guide part 50 where the spring 13 is internally installed in advance.

Meanwhile, the detent part 80 is pre-fixed to the casing 61 of the actuator 60. The detent part 80 is assembled to the moving part 70 and the valve plug 40 such that the locking rod 82 of the detent part 80 fixed to the casing 61 is inserted into the slit 75 and the slit 47. Consequently, as shown in FIG. 8, the locking rod 82 penetrates the slit 75 of the moving part 70 and the slit 47 of the valve plug 40.

Finally, as shown in FIG. 3, the casing 61 is fixed to the throttle body 12 by using the pressing plate 69 and the fastening bolt 68. A cylindrical spacer 63 is disposed between the casing 61 and the guide part 50. The guide part 50 is fixed in the axial direction by the casing 61 via the cylindrical spacer 63.

The control characteristics of the bypass air amount and the fuel vapor amount of the air amount adjustment valve 30 in the above-described configuration can be adjusted depending on opening positions of the first communication holes 52 and the second communication hole 54.

Figure 9A:
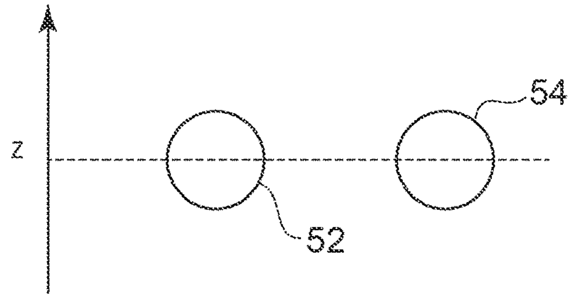
FIG. 9A is a view showing a positional relationship between the first communication hole and the second communication hole in a z direction according to an embodiment.
Figure 9B:
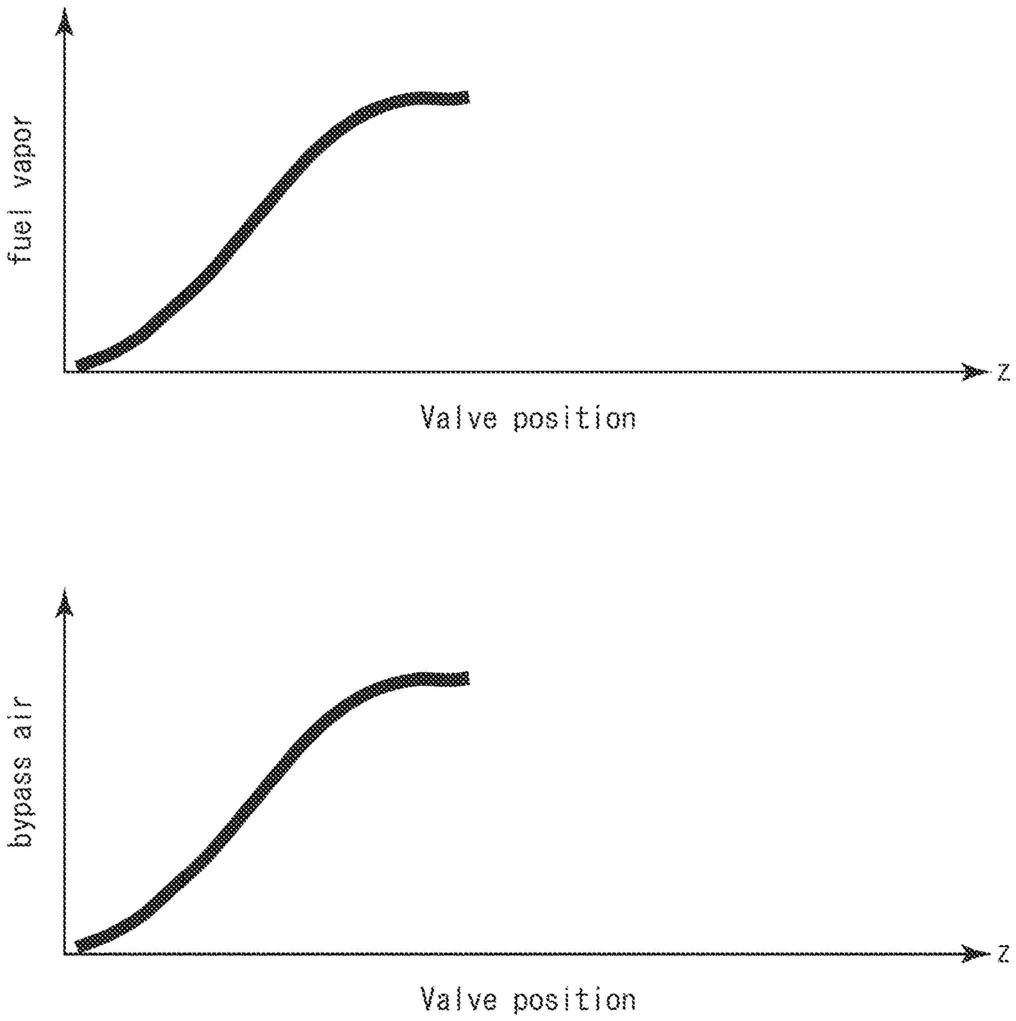
FIG. 9B is a graph showing control characteristics of a bypass air amount and a fuel vapor amount according to an embodiment.

FIG. 9A is a view showing a positional relationship between the first communication hole 52 and the second communication hole 54 in the z direction according to an embodiment. FIG. 9B is a graph showing control characteristics of a bypass air amount and a fuel vapor amount according to an embodiment.

Figure 10A:
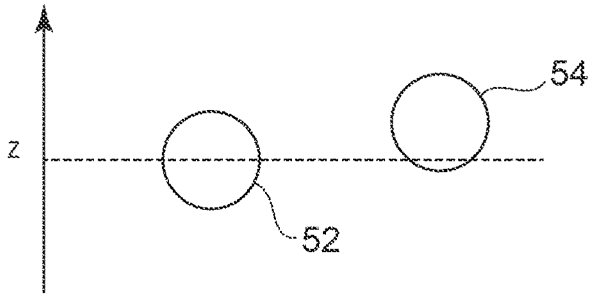
FIG. 10A is a view showing a positional relationship between the first communication hole and the second communication hole in the z direction according to another embodiment.
Figure 10B:
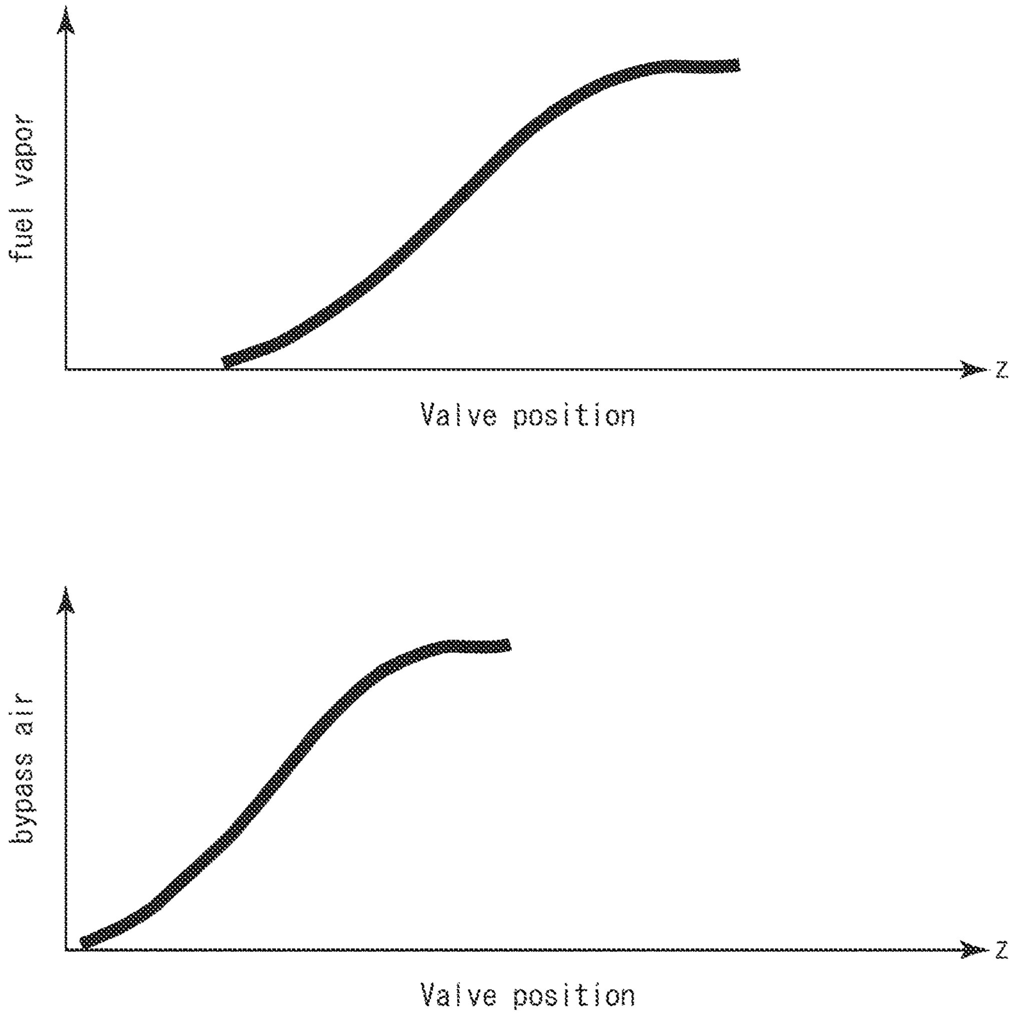
FIG. 10B is a graph showing control characteristics of a bypass air amount and a fuel vapor amount according to another embodiment.

FIG. 10A is a view showing a positional relationship between the first communication hole 52 and the second communication hole 54 in the z direction according to another embodiment. FIG. 10B is a graph showing control characteristics of a bypass air amount and a fuel vapor amount according to another embodiment.

Figure 11A:
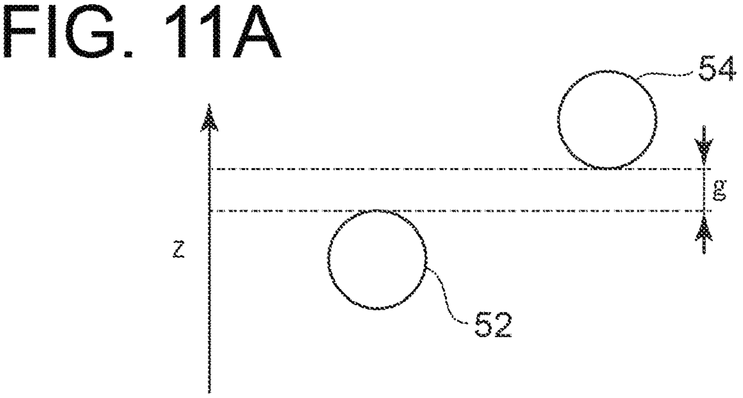
FIG. 11A is a view showing a positional relationship between the first communication hole and the second communication hole in the z direction according to still another embodiment.
Figure 11B:
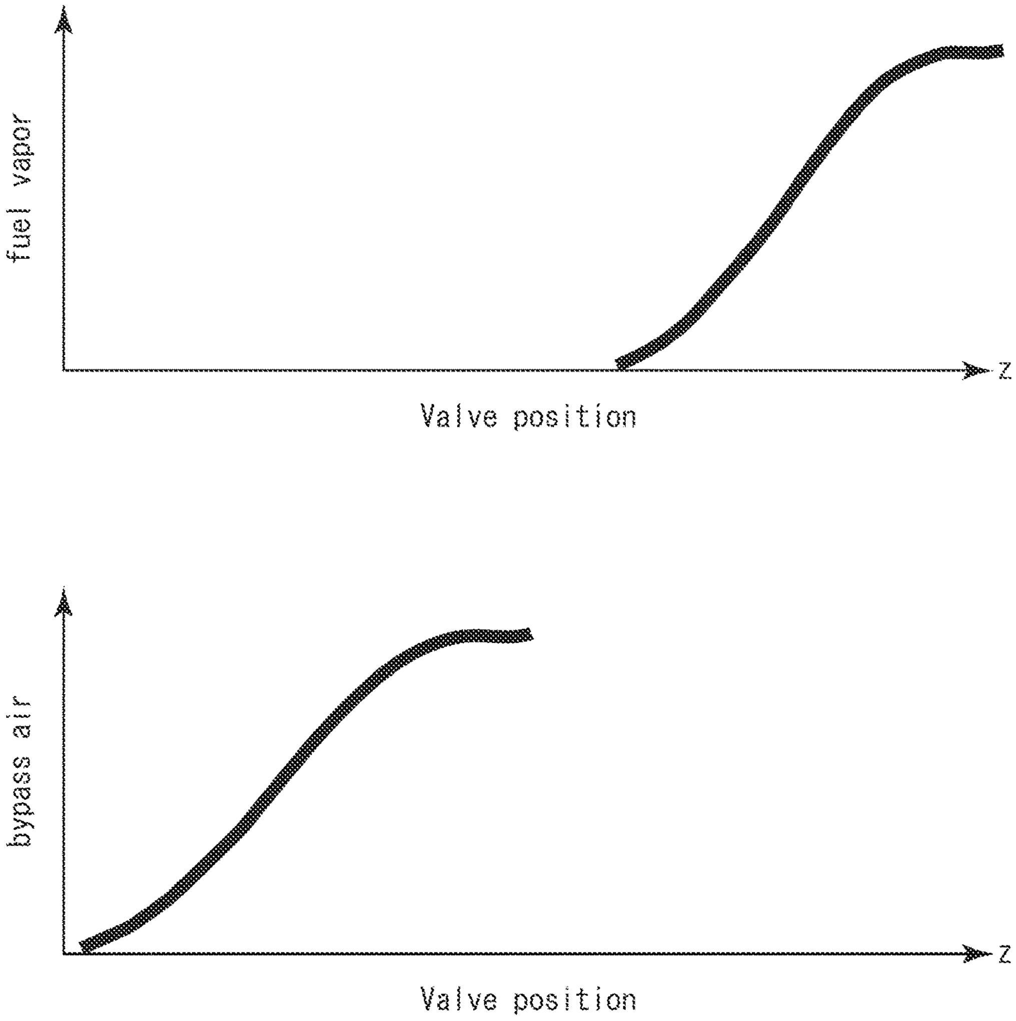
FIG. 11B is a graph showing control characteristics of a bypass air amount and a fuel vapor amount according to still another embodiment.

FIG. 11A is a view showing a positional relationship between the first communication hole 52 and the second communication hole 54 in the z direction according to still another embodiment. FIG. 11B is a graph showing control characteristics of a bypass air amount and a fuel vapor amount according to still another embodiment.

The horizontal axis in FIG. 9B, 10B, 11B is the amount of movement of the valve plug 40 in the axial direction (z direction).

In the embodiment shown in FIG. 9A, the center of the circular first communication hole 52 (52A to 52D) and the center of the circular second communication hole 54 coincide in z-direction position.

In this case, as the valve plug 40 moves in the axial direction (z direction), the first effective opening area of the first communication hole 52 which is not blocked by the valve plug 40 and the second effective opening area of the second communication hole 54 which is not blocked by the valve plug 40 change synchronously.

As a result, as shown in FIG. 9B, the amount of bypass air to each intake passage 10 via the first communication hole 52 and the amount of fuel vapor mixed into the bypass air flow flowing through the secondary passage 102 via the second communication hole 54 also change in conjunction.

By contrast, in the embodiment shown in FIG. 10A, the center of the circular second communication hole 54 is displaced to the actuator 60 side in regard to the z direction, compared to the center of the circular first communication hole 52 (52A to 52D). However, the first communication hole 52 and the second communication hole 54 partially overlap each other in regard to the z direction.

In this case, a gap occurs between a start timing and an end timing of the change in the first effective opening area and the second effective opening area along with the movement of the valve plug 40 in the axial direction (z direction). Specifically, if the valve plug 40 starts to move in the axial direction from a state where the first communication hole 52 and the second communication hole 54 are fully closed, the first effective opening area of the first communication hole 52 first starts to increase. Thereafter, along with the continued movement of the valve plug 40 in the axial direction, the second effective opening area of the second communication hole 54 starts to increase with a delay. The increase in the second effective opening area of the second communication hole 54 continues for some time after the first communication hole 52 is fully opened.

As a result, as shown in FIG. 10B, the amount of bypass air to each intake passage 10 via the first communication hole 52 first starts to increase. Thereafter, the amount of fuel vapor mixed into the bypass air flow flowing through the secondary passage 102 via the second communication hole 54 starts to increase with a delay. After the bypass air amount reaches its maximum value, the fuel vapor amount reaches its maximum value with a delay.

By contrast, in the embodiment shown in FIG. 11A, the center of the circular second communication hole 54 is displaced to the actuator 60 side in regard to the z direction, compared to the center of the circular first communication hole 52 (52A to 52D). Further, the first communication hole 52 and the second communication hole 54 do not partially overlap each other in regard to the z direction, and a gap g in the z direction exists between the first communication hole 52 and the second communication hole 54.

In this case, a gap occurs between a start timing and an end timing of the change in the first effective opening area and the second effective opening area along with the movement of the valve plug 40 in the axial direction (z direction). Specifically, if the valve plug 40 starts to move in the axial direction from a state where the first communication hole 52 and the second communication hole 54 are fully closed, the first effective opening area of the first communication hole 52 first starts to increase. After the first communication hole 52 is fully opened and the first effective opening area reaches its maximum value, the second effective opening area of the second communication hole 54 finally starts to increase along with further movement of the valve plug 40 in the axial direction.

As a result, as shown in FIG. 11B, the amount of bypass air to each intake passage 10 via the first communication hole 52 increases and the bypass air amount reaches its maximum value. Thereafter, the amount of fuel vapor mixed into the bypass air flow flowing through the secondary passage 102 via the second communication hole 54 starts to increase with a delay.

The characteristic configurations of the multiple throttle device 100 according to some embodiments described above are summarized as follows.

[1] A multiple throttle device (100) according to at least some embodiments of the present invention, includes: a throttle body (12) having a plurality of intake passages (10); a plurality of throttle valves (20) respectively disposed in the plurality of intake passages (10); a plurality of secondary passages (102) respectively bypassing the plurality of throttle valves (20); and an air amount adjustment valve (30) for adjusting an amount of air flowing through the plurality of secondary passages (102). The air amount adjustment valve (30) includes: a valve plug (40); a guide part (50) disposed radially outward of the valve plug (40) so as to surround the valve plug (40) and configured to guide the valve plug (40) in an axial direction; and an actuator (60) for driving the valve plug (40) such that the valve plug (40) slides in the axial direction and along an inner peripheral surface (51) of the guide part (50). Opening into the inner peripheral surface (51) of the guide part (50) are: a plurality of first communication holes (52) respectively communicating with downstream sides of the throttle valves (20) in the plurality of intake passages (10); and a second communication hole (54) communicating with a canister (9) for collecting fuel vapor. The actuator (60) is configured to adjust a position of the valve plug (40) in the axial direction such that a first effective opening area of each of the first communication holes (52) which is not blocked by the valve plug (40) and a second effective opening area of the second communication hole (54) which is not blocked by the valve plug (40) change.

According to the above configuration [1], since the air amount adjustment valve for adjusting the amount of air flowing through the plurality of secondary passages of the multiple throttle device controls the respective effective opening areas of the first communication holes and the second communication hole disposed in the inner peripheral surface of the guide part, it is possible to achieve the function of adjusting the fuel vapor purge amount.

Since the air amount adjustment valve can thus fulfill the function of adjusting the flow rate of bypass air flowing through the secondary passages and the function of adjusting the fuel vapor purge amount, the number of parts can be reduced compared to a case where a fuel vapor purge amount adjustment valve is provided separately from the air amount adjustment valve. Thus, it is possible to achieve compactness of the multiple throttle device.

Further, since the effective opening areas of the first communication holes and the second communication hole are adjusted by the valve plug sliding in the axial direction and along the inner peripheral surface of the guide part, the accuracy of flow adjustment is improved compared to a case where a valve is adopted which is configured to adjust the bypass air amount or the fuel vapor purge amount by a conical plunger. Whereby, it is possible to suppress variations in amount of bypass air distributed to the respective intake passages and to appropriately control the flow ratio of bypass air to the fuel vapor purge amount.

[2] In some embodiments, in the above configuration [1], the plurality of first communication holes (52) are disposed at the same axial position and at mutually different circumferential positions.

According to the above configuration [2], the effective opening areas of the plurality of first communication holes respectively corresponding to the plurality of intake passages can be changed synchronously with each other by adjusting the axial position of the valve plug. Whereby, it is possible to suppress the variations in amount of bypass air distributed to the respective intake passages.

[3] In some embodiments, in the above configuration [1] or [2], the second communication hole (54) is disposed at a position displaced from each of the first communication holes (52) in the axial direction.

According to the above configuration [3], the effective opening area of the second communication hole communicating with the canister can be changed at a timing independent of the first communication holes by adjusting the axial position of the valve plug. Whereby, it is possible to appropriately control the fuel vapor purge amount without being influenced by the control of bypass air supply to each intake passage.

[4] In some embodiments, in any of the above configurations [1] to [3], the actuator (60) is a stepper motor including an output shaft (66) provided with a male thread (67) on an outer circumference thereof, the air amount adjustment valve (30) includes: a moving part (70) having a female thread (71) screwed with the male thread (67) of the output shaft (66); and a detent part (80) for regulating a rotation of the moving part (70), and the stepper motor (60) is configured to move the moving part (70) in the axial direction along with a rotation of the output shaft (66), and to move the valve plug (40) via the moving part (70) in the axial direction.

According to the above configuration [4], the moving part and the valve plug can be positioned with high accuracy by using the stepper motor, and with a simple configuration, it is possible to appropriately adjust the fuel vapor purge amount and the amount of bypass air supplied to each intake passage.

[5] In some embodiments, in any of the above configurations [1] to [4], the guide part (50) is a guide cylinder surrounding the valve plug (40).

According to the above configuration [5], the air amount adjustment valve including the valve plug, the guide cylinder, and the actuator can be handled as a component independent of the throttle body of the multiple throttle device. Whereby, the air amount adjustment valve as the common component is easily mounted on different varieties of multiple throttle devices. Alternatively, it is easy to independently change a design of the air amount adjustment valve in accordance with required specifications of the multiple throttle device while reducing the influence on the throttle body side.

[6] In some embodiments, in any of the above configurations [1] to [5], the plurality of intake passages (10) extend along a direction (x) orthogonal to a valve shaft direction (y) of the throttle valves (20) so as to be aligned in the valve shaft direction (y), and the air amount adjustment valve (30) is disposed between one pair of intake passages (10A, 10B) adjacent in the valve shaft direction (y) among the plurality of intake passages (10).

According to the above configuration [6], the space between the one pair of intake passages of the multiple throttle device can effectively be utilized to arrange the air amount adjustment valve.

[7] In some embodiments, in the above configuration [6], the throttle body (12) includes internal passages (106A, 106B) for causing two communication holes (52A, 52B) among the plurality of first communication holes (52) to respectively communicate with the one pair of adjacent intake passages (10A, 10B), and the multiple throttle device (100) includes a flexible tube (110C, 110D) for causing another intake passage (10C, 10D) excluding the one pair of adjacent intake passages (10A, 10B) among the plurality of intake passages (10) to communicate with one of the first communication holes (52C, 52D) corresponding to the another intake passage (10C, 10D).

According to the above configuration [7], it is possible to connect each of the first communication holes to the corresponding one of the intake passages via the flexible tube or the internal passage of the throttle body, and the multiple throttle device can be more compact. [8] An air amount adjustment valve (30) according to at least some embodiments of the present invention is an air amount adjustment valve (30) for adjusting an amount of air in a plurality of secondary passages (102) respectively bypassing a plurality of throttle valves (20) of a multiple throttle device (100), including: a valve plug (40); a guide part (50) disposed radially outward of the valve plug (40) so as to surround the valve plug (40) and configured to guide the valve plug (40) in an axial direction; and an actuator (60) for driving the valve plug (40) such that the valve plug (40) slides in the axial direction and along an inner peripheral surface (51) of the guide part (50). Opening into the inner peripheral surface (51) of the guide part (50) are: a plurality of first communication holes (52); and a second communication hole (54) disposed at a position displaced from each of the first communication holes (52) in the axial direction. The actuator (60) is configured to adjust a position of the valve plug (40) in the axial direction such that a first effective opening area of each of the first communication holes (52) which is not blocked by the valve plug (40) and a second effective opening area of the second communication hole (54) which is not blocked by the valve plug (40) change.

If the air amount adjustment valve according to the above configuration [8] is assembled in the multiple throttle device such that the plurality of first communication holes respectively communicate with the plurality of intake passages (the downstream portions of the throttle valves) and the second communication hole communicates with the canister, the function of adjusting the bypass air flow rate and the function of adjusting the fuel vapor purge amount can be achieved by the air amount adjustment valve.

Since the air amount adjustment valve thus fulfills the function of adjusting the flow rate of bypass air flowing through the secondary passages and the function of adjusting the fuel vapor purge amount, the number of parts can be reduced compared to a case where a fuel vapor purge amount adjustment valve is provided separately from the air amount adjustment valve. Thus, it is possible to achieve compactness of the multiple throttle device.

Further, according to the above configuration [8], since the second communication hole is disposed at the position displaced from each of the first communication holes in the axial direction, the effective opening area of the second communication hole communicating with the canister can be changed at a timing independent of the first communication holes by adjusting the axial position of the valve plug. Whereby, it is possible to appropriately control the fuel vapor purge amount without being influenced by the control of bypass air supply to each intake passage.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved. As used herein, the expressions "comprising", "including" or "having" one constitutional element is not an exclusive expression that excludes the presence of other constitutional elements.

The invention claimed is:

1. A multiple throttle device, comprising:
- a throttle body having a plurality of intake passages;
- a plurality of throttle valves respectively disposed in the plurality of intake passages;
- a plurality of secondary passages respectively bypassing the plurality of throttle valves; and
- an air amount adjustment valve disposed in the plurality of secondary passages and configured to adjust an amount of air flowing through the plurality of secondary passages,
- the air amount adjustment valve including:
  - a valve plug;
  - a guide part disposed radially outward of the valve plug so as to surround the valve plug and configured to guide the valve plug in an axial direction; and
  - an actuator for driving the valve plug such that the valve plug slides in the axial direction and along an inner peripheral surface of the guide part,
- the guide part including:
  - a plurality of first communication holes having:
    - upstream ends opening at the inner peripheral surface of the guide part; and
    - downstream ends respectively communicable with downstream sides of the throttle valves in the plurality of intake passages; and
  - a second communication hole which includes:
    - an upstream end communicable with a communication port between the air amount adjustment valve and a canister for collecting fuel vapor; and
    - a downstream end opening at the inner peripheral surface of the guide part, and the actuator being configured to adjust a position of the valve plug in the axial direction such that a first effective opening area of each of the plurality of first communication holes which is not blocked by the valve plug and a second effective opening area of the second communication hole which is not blocked by the valve plug change.

2. A multiple throttle device, comprising:

a throttle body having a plurality of intake passages;

a plurality of throttle valves respectively disposed in the plurality of intake passages;

a plurality of secondary passages respectively bypassing the plurality of throttle valves; and an air amount adjustment valve for adjusting an amount of air flowing through the plurality of secondary passages, the air amount adjustment valve including:

a valve plug;

a guide part disposed radially outward of the valve plug so as to surround the valve plug and configured to guide the valve plug in an axial direction; and an actuator for driving the valve plug such that the valve plug slides in the axial direction and along an inner peripheral surface of the guide part, the guide part including:

a plurality of first communication holes respectively configured to communicate with downstream sides of the throttle valves in the plurality of intake passages; and a second communication hole configured to communicate with a canister for collecting fuel vapor, and the actuator being configured to adjust a position of the valve plug in the axial direction such that a first effective opening area of each of the plurality of first communication holes which is not blocked by the valve plug and a second effective opening area of the second communication hole which is not blocked by the valve plug change, wherein the plurality of first communication holes are disposed at the same axial position and at mutually different circumferential positions.

3. The multiple throttle device according to claim 1, wherein the second communication hole is disposed at a position displaced from each of the plurality of first communication holes in the axial direction.

4. The multiple throttle device according to claim 1, wherein the actuator is a stepper motor including an output shaft provided with a male thread on an outer circumference of the output shaft, the air amount adjustment valve further includes:

a moving part having a female thread screwed with the male thread of the output shaft; and a detent part for regulating a rotation of the moving part, and the stepper motor is configured to move the moving part in the axial direction along with a rotation of the output shaft, and to move the valve plug via the moving part in the axial direction.

5. The multiple throttle device according to claim 1, wherein the guide part is a guide cylinder surrounding the valve plug.

6. The multiple throttle device according to claim 1, wherein the plurality of intake passages extend along a direction orthogonal to a valve shaft direction of the throttle valves so as to be aligned in the valve shaft direction, and the air amount adjustment valve is disposed between one pair of intake passages adjacent in the valve shaft direction among the plurality of intake passages.

7. The multiple throttle device according to claim 6, wherein the throttle body includes internal passages for causing two communication holes among the plurality of first communication holes to respectively communicate with the one pair of adjacent intake passages, and the multiple throttle device comprises a flexible tube for causing another intake passage excluding the one pair of adjacent intake passages among the plurality of intake passages to communicate with one of the first communication holes corresponding to the another intake passage.

8. The multiple throttle device according to claim 1, wherein the secondary passages include:

an upstream portion communicating with a passage upstream of the throttle valves in the intake passages; and downstream portions communicating with passages downstream of the throttle valves in the intake passages, the guide part has an inner space for generating a mixture of the fuel vapor taken in via the second communication hole and bypass air flowing through the upstream portion of the secondary passages, and each of the plurality of first communication holes is configured to direct the mixture generated in the inner space of the guide part to the downstream sides of the throttle valves in the plurality of intake passages.

9. The multiple throttle device according to claim 1, wherein the valve plug includes a cylindrical portion having an outer peripheral surface in sliding contact with the inner peripheral surface of the guide part, and the plurality of first communication holes and the second communication hole are located inside a movable range of the valve plug with reference to a position of a lower end of the cylindrical portion.

10. An air amount adjustment valve for adjusting an amount of air in a plurality of secondary passages respectively bypassing a plurality of throttle valves of a multiple throttle device, comprising:

a valve plug;

a guide part disposed radially outward of the valve plug so as to surround the valve plug and configured to guide the valve plug in an axial direction; and an actuator for driving the valve plug such that the valve plug slides in the axial direction and along an inner peripheral surface of the guide part, the guide part including:

a plurality of first communication holes; and a second communication hole disposed at a position displaced from each of the plurality of first communication holes in the axial direction, and the actuator being configured to adjust a position of the valve plug in the axial direction such that a first effective opening area of each of the plurality of first communication holes which is not blocked by the valve plug and a second effective opening area of the second communication hole which is not blocked by the valve plug change, wherein the plurality of first communication holes are disposed at the same axial position and at mutually different circumferential positions.

* * * * *